United States Patent
Kim et al.

(10) Patent No.: US 9,476,702 B2
(45) Date of Patent: Oct. 25, 2016

(54) DEVICE FOR MEASURING LENGTH OF ELECTRODE PLATE

(71) Applicants: SAMSUNG SDI CO., LTD., Yongin-si, Gyeonggi-do (KR); ROBERT BOSCH GMBH, Stuttgart (DE)

(72) Inventors: In Kim, Yongin-si (KR); Eun-Jung Kim, Yongin-si (KR); Yong-Shik Hwang, Yongin-si (KR); Duk-Jung Kim, Yongin-si (KR); Hyung-Sik Kim, Yongin-si (KR); Soo-Seok Choi, Yongin-si (KR)

(73) Assignees: SAMSUNG SDI CO., LTD., Yongin-si, Gyeonggi-do (KR); ROBERT BOSCH GMBH, Stuttgart (DE)

( * ) Notice: Subject to any disclaimer, the term of this patent is extended or adjusted under 35 U.S.C. 154(b) by 502 days.

(21) Appl. No.: 14/016,464

(22) Filed: Sep. 3, 2013

(65) Prior Publication Data

US 2014/0288860 A1 Sep. 25, 2014

(30) Foreign Application Priority Data

Mar. 21, 2013 (KR) .................. 10-2013-0030530

(51) Int. Cl.
*G01B 17/02* (2006.01)
*G01B 21/02* (2006.01)

(52) U.S. Cl.
CPC .............. *G01B 17/02* (2013.01); *G01B 21/02* (2013.01)

(58) Field of Classification Search
CPC ... G01B 17/02; G01B 21/02; H01M 4/0435; H01M 4/139; H01M 4/0404; Y10T 29/49108; Y10T 29/49115

USPC ......... 702/56; 29/623.5, 2, 623.1, 78.16, 83; 429/120, 61, 94, 211, 231.95, 332, 429/220, 209

See application file for complete search history.

(56) References Cited

U.S. PATENT DOCUMENTS 5,780,181 A * 7/1998 Idota ..................... H01M 4/485
   429/221
6,054,010 A * 4/2000 Tanaka ................... H01M 4/04
   156/234

(Continued)

FOREIGN PATENT DOCUMENTS

JP    09-089545       4/1997
JP    2001-183129 A   7/2001

(Continued)

OTHER PUBLICATIONS

Korean Office Action dated Mar. 16, 2016.

(Continued)

*Primary Examiner* — Carol S Tsai
(74) *Attorney, Agent, or Firm* — Lee & Morse P.C.

(57) ABSTRACT

A system for measuring a length of an electrode plate includes a body on which an electrode plate roll formed by spirally winding the electrode plate is provided; a control device to which the body is combined; and a measuring device including a thickness measurement unit combined with the body and electrically connected to the control device to measure a spirally wound thickness of the electrode plate that is spirally wound on the electrode plate roll, and a diameter measurement unit to measure a diameter of a hollow portion of the electrode plate roll, wherein the control device receives a moving distance of the thickness measurement unit and a moving distance of the diameter measurement unit and calculates the length of the electrode plate of the electrode plate roll.

13 Claims, 5 Drawing Sheets

(56) References Cited

U.S. PATENT DOCUMENTS

| | | | | |
|---|---|---|---|---|
| 6,162,264 | A * | 12/2000 | Miyazaki | B44C 1/1712 29/623.5 |
| 6,234,225 | B1 * | 5/2001 | Tanaka | H01M 4/04 118/66 |
| 6,235,426 | B1 * | 5/2001 | Yanai | H01M 2/263 429/178 |
| 6,423,446 | B1 * | 7/2002 | Miyazaki | H01M 4/04 152/234 |
| 6,458,485 | B2 * | 10/2002 | Yanai | H01M 2/263 429/211 |
| 7,409,976 | B2 * | 8/2008 | Chevalier | B31B 1/62 156/356 |
| 7,799,469 | B2 * | 9/2010 | Yamamoto | H01M 10/0567 429/199 |
| 7,967,594 | B2 * | 6/2011 | Tazoe | H01M 4/0435 425/363 |
| 8,262,746 | B2 * | 9/2012 | Ito | H01M 4/04 29/623.5 |
| 8,586,223 | B2 * | 11/2013 | Bak | H01M 2/023 429/164 |
| 8,734,997 | B2 * | 5/2014 | Shibutani | H01M 4/02 429/209 |
| 8,920,972 | B2 * | 12/2014 | Kim | H01M 2/18 156/182 |
| 8,999,543 | B2 * | 4/2015 | Cho | H01M 4/13 429/176 |
| 2002/0110518 | A1 * | 8/2002 | Okuda | C01G 51/42 423/594.4 |
| 2004/0170887 | A1 * | 9/2004 | Masumoto | H01M 2/0404 429/61 |
| 2006/0049065 | A1 * | 3/2006 | Chevalier | B31B 1/62 206/216 |
| 2007/0141452 | A1 * | 6/2007 | Kim | H01M 2/0202 429/120 |
| 2007/0243470 | A1 * | 10/2007 | Yamamoto | H01M 10/0567 429/326 |
| 2008/0098590 | A1 * | 5/2008 | Tazoe | H01M 4/0435 29/623.5 |
| 2008/0248386 | A1 * | 10/2008 | Obrovac | H01M 4/0435 429/209 |
| 2009/0169993 | A1 * | 7/2009 | Ohashi | H01G 9/151 429/209 |
| 2010/0112451 | A1 * | 5/2010 | Shibutani | H01M 4/02 429/231.95 |
| 2010/0212817 | A1 * | 8/2010 | Nagare | H01M 4/08 156/192 |
| 2010/0221607 | A1 * | 9/2010 | Hatanaka | H01M 2/1673 429/209 |
| 2010/0330267 | A1 * | 12/2010 | Shimizu | H01M 4/0404 427/77 |
| 2010/0330427 | A1 * | 12/2010 | Kogetsu | H01M 2/22 429/220 |
| 2011/0045341 | A1 * | 2/2011 | Bak | H01M 2/023 429/164 |
| 2011/0163074 | A1 * | 7/2011 | Kaga | B23K 11/04 219/83 |
| 2013/0168365 | A1 * | 7/2013 | Kaga | B23K 11/061 219/78.16 |
| 2013/0248636 | A1 * | 9/2013 | Nakahata | H01F 41/0641 242/437.3 |

FOREIGN PATENT DOCUMENTS

| | | |
|---|---|---|
| JP | 2002-037490 | 2/2002 |
| JP | 2010-101656 | 5/2010 |
| KR | 1998-045940 U | 9/1998 |
| KR | 10-2009-0063720 A | 6/2009 |

OTHER PUBLICATIONS

Korean Notice of Allowance dated Aug. 16, 2016 in Corresponding Korean Patent Application No. 10-2013-0030530.

* cited by examiner

DEVICE FOR MEASURING LENGTH OF ELECTRODE PLATE

CROSS-REFERENCE TO RELATED APPLICATION

Korean Patent Application No. 10-2013-0030530, filed on Mar. 31, 2013, in the Korean Intellectual Property Office, and entitled: "A Device For Measuring Length of Electrode Plate," is incorporated by reference herein in its entirety.

BACKGROUND

1. Field

Embodiments relate to a system for measuring a length of an electrode plate.

2. Description of the Related Art

A rechargeable battery can be repeatedly charged and discharged, unlike a primary battery that cannot be recharged. A low-capacity rechargeable battery is used for small portable electronic devices, such as mobile phones, laptop computers, and camcorders. A large-capacity battery is used as a power source for driving motors, such as for hybrid vehicles.

In recent years, a high-output rechargeable battery using a non-aqueous electrolytic solution having high energy density has been developed. The high-output rechargeable battery is configured as a large-capacity battery module by connecting a plurality of rechargeable batteries in series to be able to be used to drive a motor of a device requiring a large amount of power, for example, an electric car, and the like.

The rechargeable battery may include an electrode assembly having an electrode plate including a positive electrode and a negative electrode provided on either side of a separator, a case accommodating the electrode assembly, a cap plate sealing an opening of the case, and an electrode terminal installed in the cap plate and electrically connected to the electrode assembly.

The above information disclosed in this Background section is only for enhancement of understanding of the background of the described technology and therefore it may contain information that does not form the prior art that is already known in this country to a person of ordinary skill in the art.

SUMMARY

Embodiments are directed to a system for measuring a length of an electrode plate, including a body on which an electrode plate roll formed by spirally winding the electrode plate is provided, a control device to which the body is combined, and a measuring device including a thickness measurement unit combined with the body and electrically connected to the control device to measure a spirally wound thickness of the electrode plate that is spirally wound on the electrode plate roll, and a diameter measurement unit to measure a diameter of a hollow portion of the electrode plate roll, wherein the control device receives a moving distance of the thickness measurement unit and a moving distance of the diameter measurement unit and calculates the length of the electrode plate of the electrode plate roll.

The thickness measurement unit may move in parallel with a second direction that is perpendicular to a central axis direction of the hollow portion of the electrode plate roll. The diameter measurement unit may move in parallel with the second direction.

The thickness measurement unit may include a first solenoid combined to the body, a first column combined to the first solenoid and moving in the second direction, and a first contact bar combined to a first end of the first column. The diameter measurement unit may include a second solenoid combined to the body, a second column combined to the second solenoid and moving in the second direction, and a second contact bar combined to a first end of the second column.

The measuring device may further include a sensor in the hollow portion of the body.

The sensor may include a sensor case in the hollow portion of the body, a first substrate in which a first ultrasonic wave generating device and a first ultrasonic wave receiving device are inside the sensor case corresponding to a bottom portion of the first column, and a second substrate in which a second ultrasonic wave generating device and a second ultrasonic wave receiving device are inside the sensor case corresponding to a bottom portion of the second column.

The first ultrasonic wave generating device and the first ultrasonic wave receiving device may measure a moving distance of the first column moving in the second direction. The second ultrasonic wave generating device and the second ultrasonic wave receiving device may measure a moving distance of the second column moving in the second direction.

The control device may further include a calculating unit that receives a value that is measured by the measuring device. The calculating unit may receive the moving distance of the first column to calculate a spirally wound thickness of the electrode plate roll, and may receive the moving distance of the second column to calculate the diameter of the hollow portion of the electrode plate roll.

The control device may include an output unit that displays at least one spirally wound thickness of the electrode plate roll, the diameter of the hollow portion of the electrode plate roll, and the length of the electrode plate of the electrode plate roll, and an input unit that inputs at least one of the diameter of the body and the thickness of the electrode plate.

The electrode plate may include a current collector and a pair of coating layers coated on respective sides of the current collector.

When the spirally wound thickness of the electrode plate roll is T1, the diameter of the body is D1, the moving distance of the second column is L2, the thickness of the current collector is T3, and the thicknesses of the pair of coating layers coated on the sides of the current collector are T4, the calculating unit may calculate a length (L) of the electrode plate spirally wound on the electrode plate roll from the following Equation 3:

$$L = \frac{((T1 + (D1 + L2)/2)^2 \times \pi) - ((D1 + L2)/2)^2 \times \pi)}{((T3 + (T4 \times 2)) \times 1)} \times 1(m). \qquad \text{(Equation 3)}$$

When a length of the electrode plate for manufacturing a single rechargeable battery is RL, the calculating unit may calculate a number (N) of rechargeable batteries that are generated by the electrode plate spirally wound on the electrode plate roll from the following Equation 4:

$$N = \frac{\left( \begin{array}{c} ((T1 + (D1 + L2)/2)^2 \times \pi) - \\ ((D1 + L2)/2)^2 \times \pi \end{array} \right)}{((T3 + (T4 \times 2) \times 1) \times RL)}. \quad \text{(Equation 4)}$$

The electrode plate may include a current collector, a pair of coating layers coated on respective sides of the current collector, and a protection layer coated on the pair of coating layers, and the electrode plate is spirally wound with a separator to form the electrode plate roll.

When the spirally wound thickness of the electrode plate roll is T1', the diameter of the body is D1', the moving distance of the second column is L2', the thickness of the current collector is T3', the thicknesses of the pair of coating layers are T4', the thickness of the protection layer is T5', and the thickness of the separator is T6', the calculating unit may calculate a length (L') of the electrode plate spirally wound on the electrode plate roll from the following Equation 5:

$$L' = \frac{((T1' + (D1' + L2')/2)^2 \times \pi) - ((D1' + L2')/2)^2 \times \pi)}{((T3' + (T4' \times 2) + (T5' \times 2) + T6') \times 1)} \times 1(m). \quad \text{(Equation 5)}$$

When the length of the electrode plate for manufacturing a single rechargeable battery is RL', the calculating unit may calculate the number (N') of rechargeable batteries that are generated by the electrode plate spirally wound on the electrode plate roll from the following Equation 6

$$N' = \frac{\left( \begin{array}{c} ((T1' + (D1' + L2')/2)^2 \times \pi) - \\ ((D1' + L2')/2)^2 \times \pi \end{array} \right)}{\left( \begin{array}{c} (T3' + (T4' \times 2) + (T5' \times 2) + T6') \times \\ 1 \times RL' \end{array} \right)}. \quad \text{(Equation 6)}$$

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
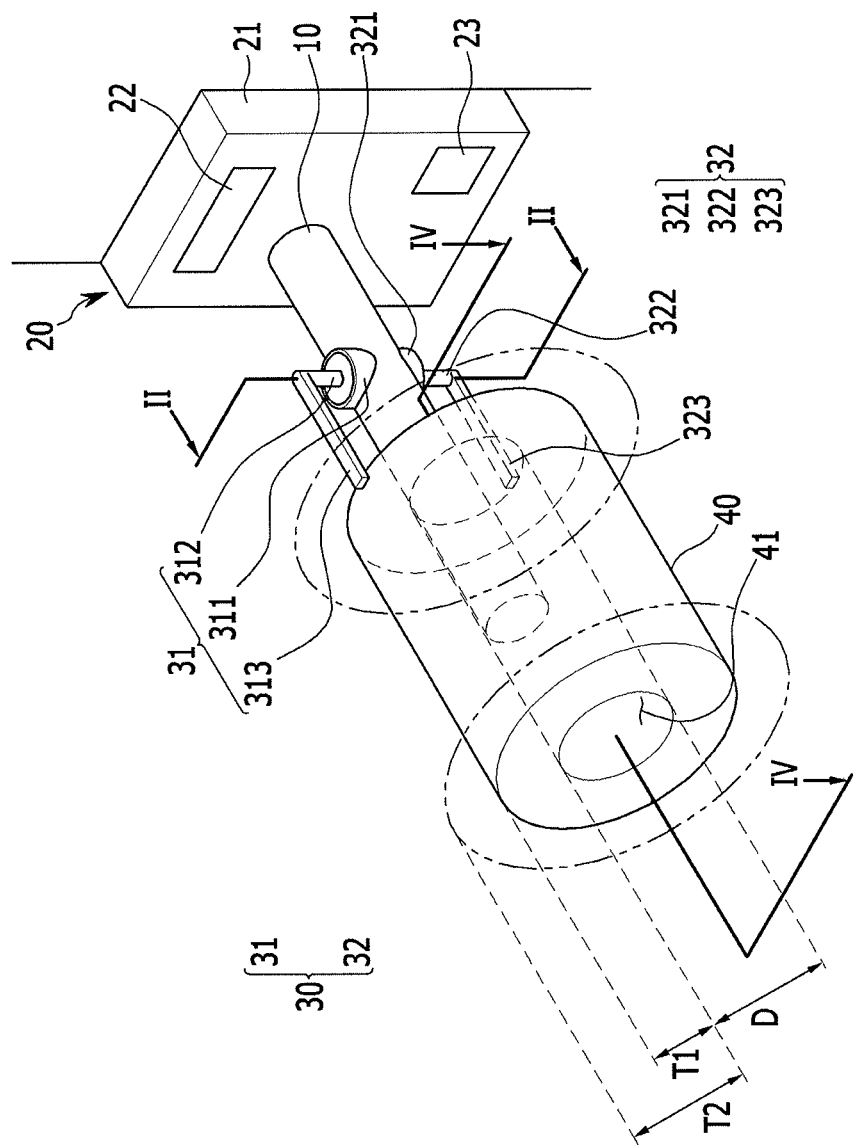
FIG. 1 illustrates a perspective view of a system for measuring a length of an electrode plate when an electrode plate roll is fixed according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
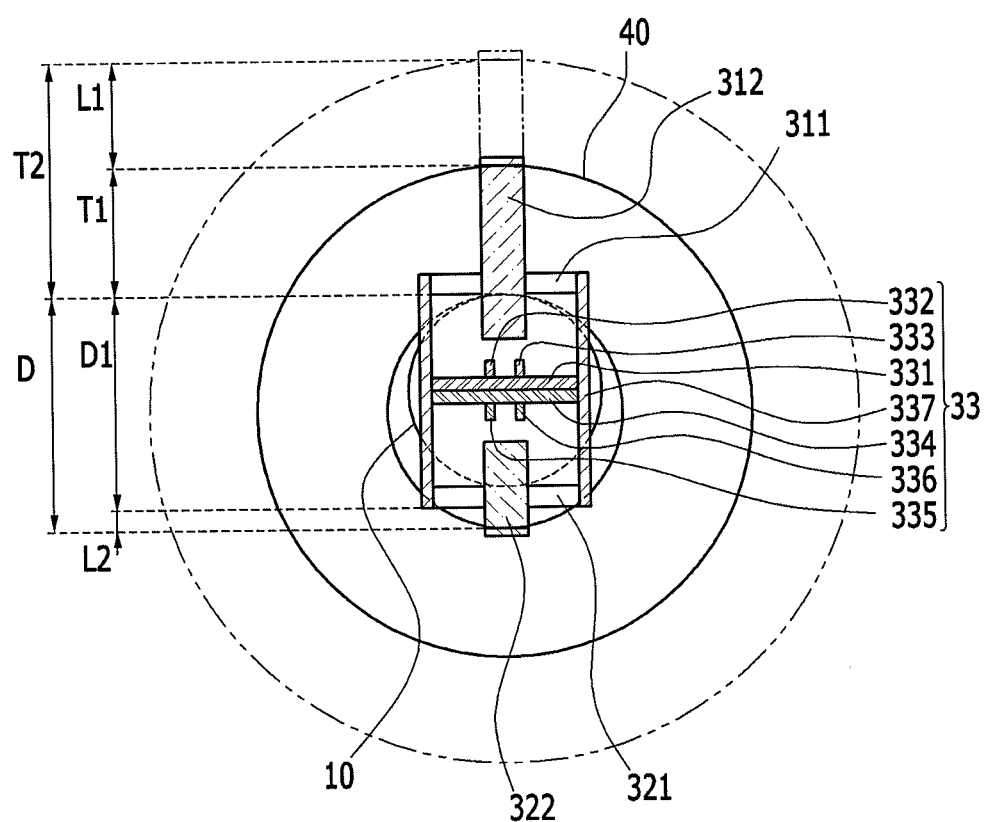
FIG. 2 illustrates a cross-sectional view with respect to a line II-II of FIG. 1.
Figure 3:
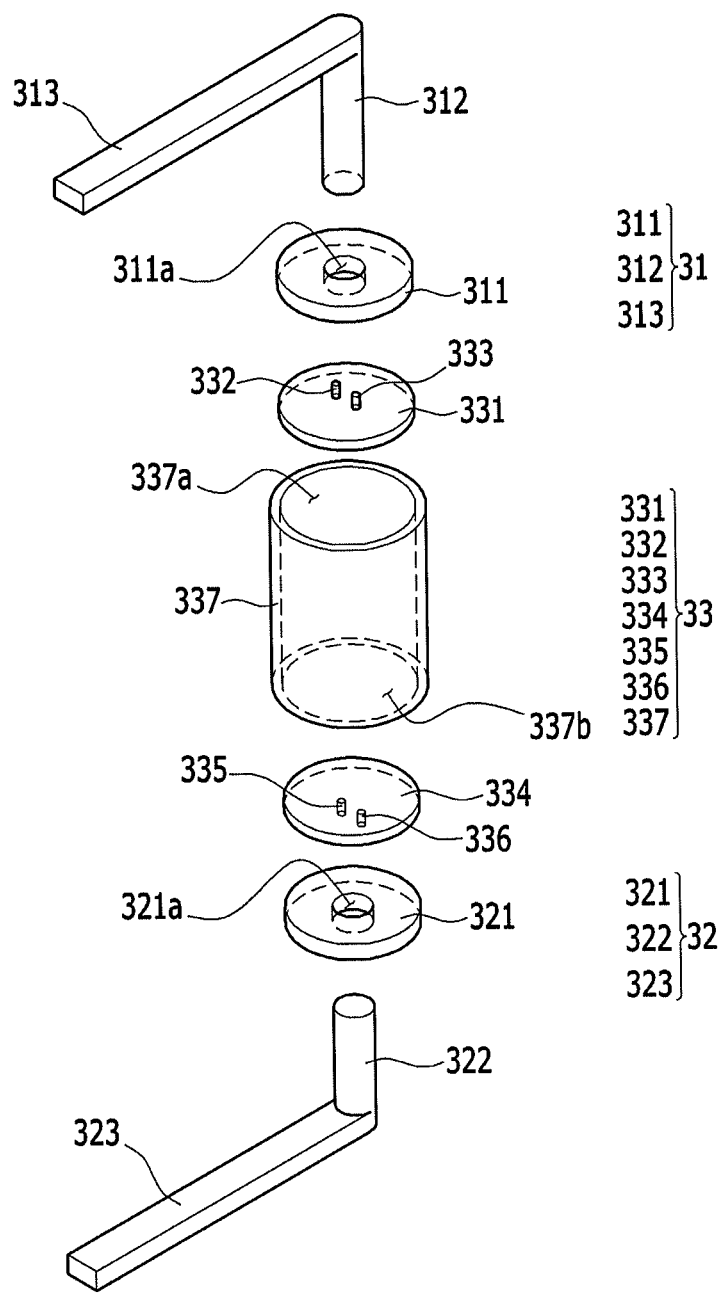
FIG. 3 illustrates an exploded perspective view of a measuring device of a system for measuring a length of an electrode plate shown in FIG. 1.

FIG. 1 illustrates a perspective view of a system for measuring a length of an electrode plate when an electrode plate roll is fixed according to an exemplary embodiment, FIG. 2 illustrates a cross-sectional view with respect to a line II-II of FIG. 1, and FIG. 3 illustrates an exploded perspective view of a measuring device of a system for measuring a length of an electrode plate shown in FIG. 1.

Referring to FIG. 1 and FIG. 2, a device for manufacturing an electrode plate according to the present exemplary embodiment includes a body 10, a control device 20, and a measuring device 30.

In detail, a cross-section of the body 10 may be circular. In other implementations, the body 10 may have other shapes, such as quadrangular or triangular. The body 10 includes a hollow portion in the body 10, and an electrode plate roll 40 is provided on one side of the body 10.

The electrode plate roll 40 is formed by spirally winding the electrode plate such that a hollow portion 41 is formed in the center of the electrode plate roll 40. Further, the electrode plate may be one of a positive electrode plate and a negative electrode plate. The hollow portion 41 is configured for insertion of one part of the body 10.

The control device 20 may include a case 21, a calculating unit installed in the case, an input unit 22, and an output unit 23.

One of a diameter of the body 10 or a thickness of the electrode plate may be input to the input unit 22 of the control device 20. At least one of the diameter of the hollow portion of the electrode plate roll calculated by the calculating unit, and the length of the electrode plate of the electrode plate roll may be displayed by the output unit 23. An end of the body 10 may be combined with the control device 20 and fixed thereto.

The measuring device 30 may include a thickness measurement unit 31, a diameter measurement unit 32, and a sensor 33. The thickness measurement unit 31 may include a first solenoid 311 that is a driving device, a first column 312, and a first contact bar 313.

In other implementations, another device for controlling normal or reverse rotation, such as a step motor, may be used instead of the solenoid 311.

The first solenoid 311 may be combined to the body 10 by a predetermined method such as welding. The first column 312 may be inserted into an opening 311a formed in the first solenoid 311 and may then be fixed thereto. The first contact bar 313 may be combined to a first end of the first column 312 by a predetermined method such as welding or may be integrally formed with the first column 312.

The diameter measurement unit 32 includes a second solenoid 321 that is a driving device, a second column 322, and a second contact bar 323. In other implementations, another device for controlling normal or reverse rotation, such as a step motor, may be used instead of the solenoid 321.

The second solenoid 321 may be combined to the body 10 by a predetermined method such as welding. The second column 322 may be inserted into an opening 321a formed in the second solenoid 321 and fixed thereto. The second contact bar 323 may be combined to a first end of the second column 322 by a predetermined method such as welding or may be integrally formed with the second column 322.

The sensor 33 may include a first substrate 331, a first ultrasonic wave generating device 332 installed on the first substrate, a first ultrasonic wave receiving device 333, a second substrate 334, a second ultrasonic wave generating device 335 installed on the second substrate 334, and a second ultrasonic wave receiving device 336.

The sensor 33 may include a sensor case 337 for receiving the first substrate 331 and the second substrate 332.

As shown in FIG. 3, the sensor 33 may include a first opening 337a and a second opening 337b at a top portion and a bottom portion that are cylindrical and face each other.

As shown in FIGS. 1 and 2, the sensor case 337 of the sensor 33 may be installed in the hollow portion of the body 10 through a hole that is formed in one side of the body 10.

The first ultrasonic wave generating device 332 and the first ultrasonic wave receiving device 333 installed on the first substrate 331 installed inside the sensor case 337 may be provided to correspond to the bottom portion of the first column 312 of the thickness measurement unit 31 toward the first opening 337a of the sensor case 337.

Further, the second ultrasonic wave generating device 335 and the second ultrasonic wave receiving device 336 installed on the second substrate 334 may be provided to correspond to the bottom portion of the second column 321 of the diameter measurement unit 32 toward the second opening 337b of the sensor case 337.

When the first column 312 of the thickness measurement unit 31 moves in a second direction that is perpendicular to a central axis direction of the body 10, a spirally-wound thickness (T1) of the electrode plate roll 40 may be calculated according to a moving distance (L1) of the first column 312, which may be measured by the first ultrasonic wave generating device 332 and the first ultrasonic wave receiving device 333 of the sensor 33.

For example, the spirally wound thickness (T1) of the electrode plate roll 40 may be measured by subtracting the moving distance (L1) of the first column 312 from an initial thickness (T2) of the electrode plate roll 40 when provided to the body 10.

When the electrode plate roll 40 is generated and provided to the body 10 and then a portion of the spirally wound electrode plate from the electrode plate roll 40 is used to produce a rechargeable battery, the thickness of the electrode plate roll 40 is changed to T1 from T2.

In this instance, the control device 20 may operate the first solenoid 311 to move the first column 312 through the opening 311a formed in the first solenoid 311 until the first contact bar 313 contacts an external side of the reduced electrode plate roll 40.

A moving distance (L1) of the first column 312 may be calculated by the first ultrasonic wave generating device 332 and the first ultrasonic wave receiving device 333 of the sensor 33.

A difference between a distance to the sensor 33 from the bottom portion of the first column 312 when the initial thickness of the electrode plate roll 40 is T2 and a distance to the sensor 33 from the bottom portion of the first column 312 when the spirally wound thickness of the electrode plate roll 40 is T1 becomes the moving distance (L1) of the first column 312.

Therefore, it may be possible to calculate the spirally wound thickness (T1) of the electrode plate roll 40 by subtracting the moving distance (L1) of the first column 312 from the initial thickness (T2) of the electrode plate roll 40.

Further, it may be possible to calculate the diameter (D) of the hollow portion 41 of the electrode plate roll 40 by measuring the distance (D1) between the external side of the body 10 and the internal side of the hollow portion 41 of the electrode plate roll 40.

The diameter (D) of the hollow portion 41 of the electrode plate roll 40 may be changeable depending on the thickness of the electrode plate or a spirally wound state of the electrode plate. Accordingly, a distance (L2) between the external side of the body 10 and the internal side of the hollow portion 41 of the electrode plate roll 40 may be changeable according to a change in the diameter (D) of the hollow portion 41 of the electrode plate roll 40 provided to the body 10. The diameter (D1) of the body 10 may be maintained.

For example, it may be possible to calculate the diameter (D) of the hollow portion 41 of the electrode plate roll 40 by summing the moving distance (L2) of the second column 322 moved by the second solenoid 321 and the original diameter (D1) of the body 10 when the body 10 is first inserted into the hollow portion 41 of the electrode plate roll 40.

It may be possible to measure the distance (L2) between the external side of the body 10 and the internal side of the hollow portion 41 of the electrode plate roll 40.

When the electrode plate roll 40 is provided to the first end of the body 10, the second column 322 is moved by the second solenoid 321 until the second contact portion 323 contacts the internal side of the hollow portion 41 of the electrode plate roll 40.

In this instance, the moving distance (L2) of the second column 322 is calculated by the second ultrasonic wave generating device 335 and the second ultrasonic wave receiving device 336 of the sensor 33.

A difference between a distance between the sensor 33 and the bottom portion of the second column 322 when the second contact portion 233 is provided on an external circumferential surface of the body 10 before the second column 322 is moved by the second solenoid 321 and a distance between the sensor 33 and the internal side of the hollow portion 41 of the electrode plate roll 40 after the second column 322 is moved by the second solenoid 321 becomes the moving distance (L2) of the second column 322.

The moving distance (L2) of the second column 322 corresponds to the distance between the external side of the body 10 and the internal side of the hollow portion 41. Accordingly, the diameter of the hollow portion 41 of the electrode plate roll 40 is calculated by the sum of the diameter (D1) of the body 10 and the moving distance (L2) of the second column 322.

As a result, an area of the cross-section of the electrode plate roll 40 may be calculated, and the length of the electrode plate spirally wound on the electrode plate roll 40 and the number of rechargeable batteries that may be generated according to the length of the electrode plate spirally wound on the electrode plate roll 40 may calculated by using the area of the cross-section of the electrode plate roll 40.

A detailed method for calculating the length of the electrode plate and the number of rechargeable batteries that can be generated according to the length of the electrode plate will be described below.

Figure 4:
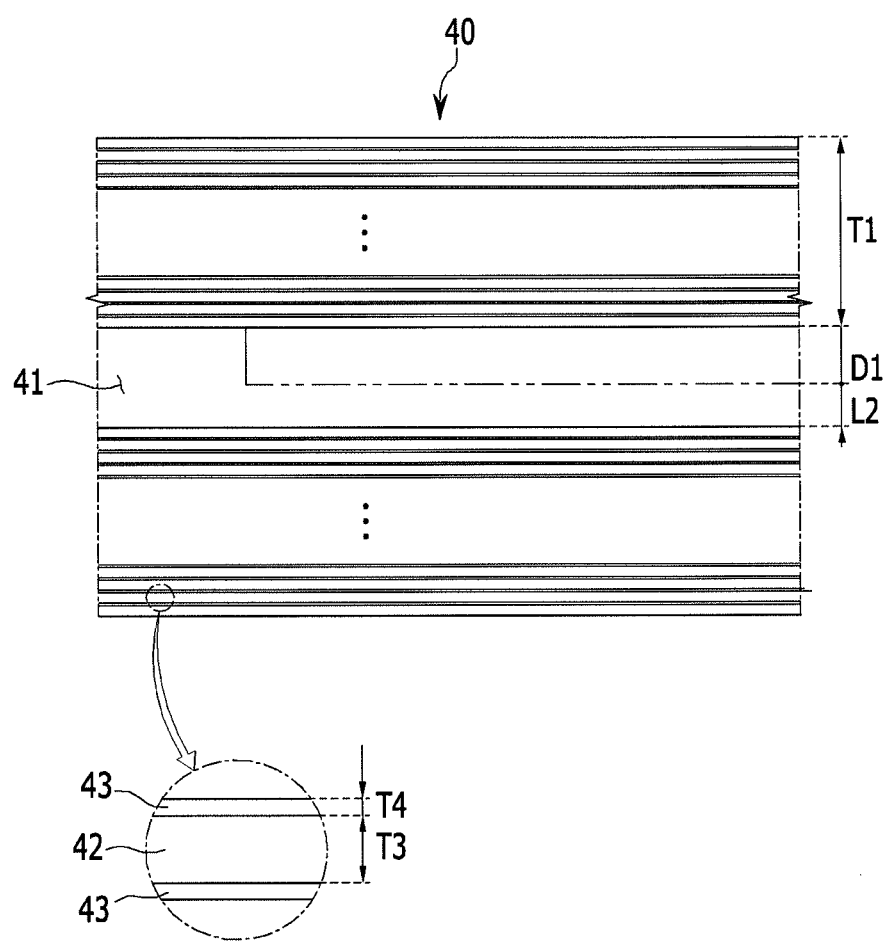
FIG. 4 illustrates a cross-sectional view with respect to a line IV-IV of FIG. 1.

FIG. 4 illustrates a cross-sectional view with respect to a line IV-IV of FIG. 1.

As shown in FIG. 4, the electrode plate may include a current collector 42 made of a thin-plate metal foil, and a coating layer 43 generated by coating an active material on respective sides of the current collector 42.

The length (L) of the electrode plate spirally wound on the electrode plate roll 40 may be calculated by a ratio of an area (A1) of a cross-section of the electrode plate roll 40 and an area (A2) per meter of the cross-section of the electrode plate roll 40.

The area (A1) of the cross-section of the spirally wound electrode plate of the electrode plate roll 40 may be calculated from Equation 1 by subtracting an area (A12) of a cross-section of the hollow portion 41 of the electrode plate roll 40 from an area (A11) of a cross-section of the electrode plate roll 40 including an area of a cross-section of the electrode plate that is not spirally wound.

$$A1 = A11 - A12 = ((T1+(D1+L2)/2)^2 \times \pi) - ((D1+L2)/2)^2 \times \pi)(m^2) \quad \text{(Equation 1)}$$

Here, T1 is a spirally wound thickness of the electrode plate roll 40, D1 is a diameter of the body 10, and L2 is a distance between an external circumferential surface of the body 10 and an interior circumference of the hollow portion 41 of the electrode plate roll 40.

Further, the area (A2) per meter of the cross-section of the electrode plate roll 40 may calculated from Equation 2 by using the spirally wound thickness (T1) of the electrode plate that is the sum of the thickness (T3) of the current collector 42 and the thickness (T4) of the coating layers 43 and the one-meter electrode plate roll 40.

The spirally wound thickness (T1) of the electrode plate may be measured in a first direction of a central axis direction of the body 10, and the length of the electrode plate may be measured in a circumference direction of the electrode plate roll 40 while the electrode plate is spirally wound on the electrode plate roll 40.

$$A2 = T1 \times 1(m^2) = (T3+(T4 \times 2)) \times 1(m^2) \quad \text{(Equation 2)}$$

Therefore, the length (L) of the electrode plate spirally wound on the electrode plate roll 40 may be calculated from Equation 3 using the area (A1) of the cross-section of the spirally wound electrode plate of the electrode plate roll 40 and the area (A2) per meter of the cross-section of the electrode plate roll 40.

$$L = \frac{A1}{A2} = \frac{((T1+(D1+L2)/2)^2 \times \pi) - ((D1+L2)/2)^2 \times \pi)}{((T3+(T4 \times 2)) \times 1)} \times 1(m) \quad \text{(Equation 3)}$$

For example, when the area (A1) of the cross-section of the spirally wound electrode plate of the electrode plate roll 40 is set as 10 m$^2$ and the area (A2) per meter of the cross-section of the electrode plate spirally wound on the electrode plate roll 40 is set as 1 m$^2$, the area (A1) of the cross-section of the spirally wound electrode plate of the electrode plate roll 40 is calculated by summing ten areas (A2) per meter of the cross-section of the electrode plate spirally wound on the electrode plate roll 40.

Therefore, when the area (A1) of the cross-section of the spirally wound electrode plate of the electrode plate roll 40 is 10 m$^2$ and the area (A2) per meter of the cross-section of the electrode plate spirally wound on the electrode plate roll 40 is 1 m$^2$, the length (L) of the electrode plate spirally wound on the electrode plate roll 40 may be calculated as being 10 m.

Further, the number (N) of the rechargeable batteries that may be generated by the length (L) of the electrode plate spirally wound on the electrode plate roll 40 may be calculated from Equation 4 by referring to a predetermined length (RL) of the electrode plate that is used for manufacturing a single rechargeable battery.

$$N = \frac{L}{RL} = \frac{(((T1+(D1+L2)/2)^2 \times \pi) - ((D1+L2)/2)^2 \times \pi)}{((T3+(T4 \times 2) \times 1) \times RL)} \quad \text{(Equation 4)}$$

The electrode plate may include a positive electrode plate and a negative electrode plate. The length of the positive electrode plate and the length of the negative electrode plate needed for manufacturing the rechargeable battery may not be the same.

Therefore, the number (N) of the rechargeable batteries that may be generated by the length (L) of the electrode plate spirally wound on the electrode plate roll 40 may vary depending on whether the electrode plate spirally wound on the electrode plate roll 40 is a positive electrode plate or a negative electrode plate.

As a result, the length (L) of the electrode plate spirally wound on the electrode plate roll 40 may be calculated by a ratio of the area (A1) of the cross-section of the spirally wound electrode plate of the electrode plate roll 40 and the area (A2) per meter of the cross-section of the electrode plate roll 40 spirally wound on the electrode plate roll 40.

Further, the number (N) of the rechargeable batteries that are generated by the electrode plate spirally wound on the electrode plate roll 40 may be calculated by a ratio of the length (L) of the electrode plate spirally wound on the electrode plate roll 40 and the length (RL) of the electrode plate of a single rechargeable battery.

Figure 5:
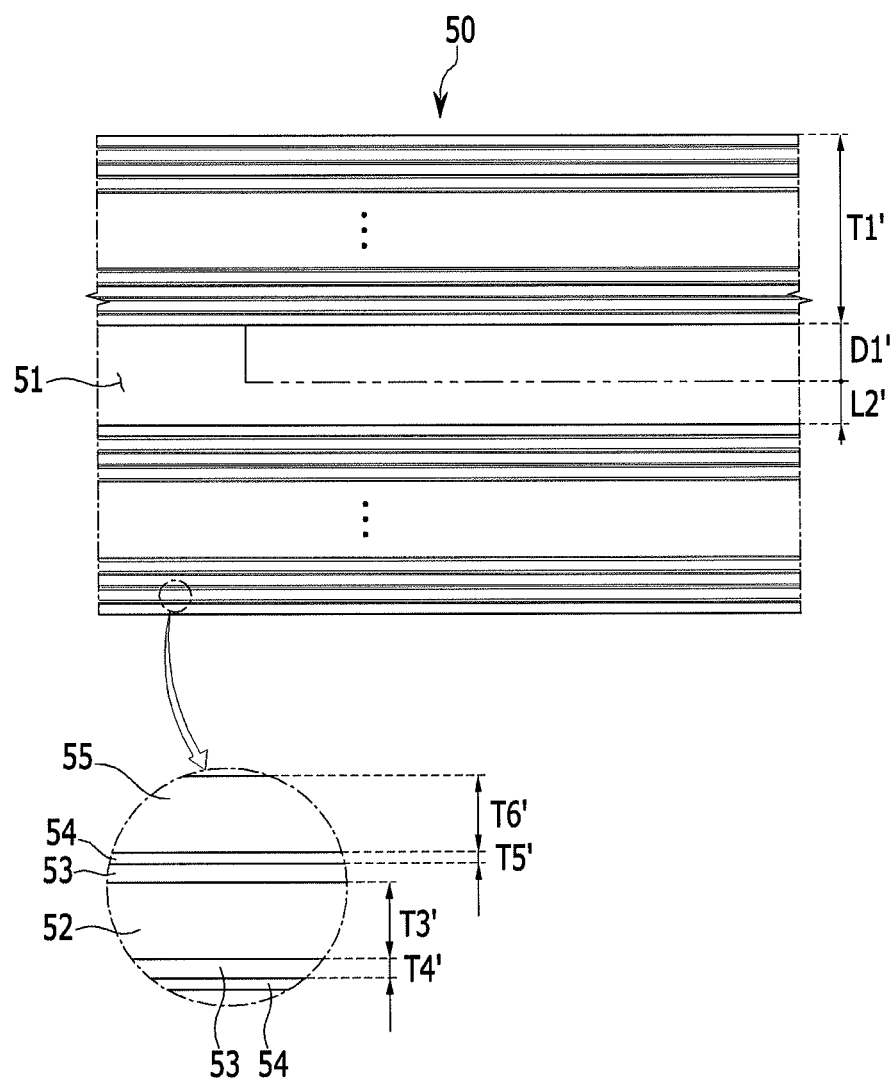
FIG. 5 illustrates a cross-sectional view of an electrode plate roll according to another exemplary embodiment.

FIG. 5 illustrates a cross-sectional view of an electrode plate roll according to another exemplary embodiment.

As shown in FIG. 5, the electrode plate may include a current collector 52 made of a thin-plate metal foil, a coating layer 53 generated by coating an active material to respective sides of the current collector 52, and a protection layer 54 coated on the coating layer 53.

Further, a separator 55 may be spirally wound on the electrode plate roll 50 together with the electrode plate.

The length (L') of the electrode plate spirally wound on the electrode plate roll 50 may be calculated by a ratio of an area (A1') of the cross-section of the electrode plate roll 50 and an area (A2') per meter of the cross-section of the electrode plate roll 40.

Here, the area (A2') per meter of the cross-section of the electrode plate roll 40 may include an area per meter of the cross-section of the separator 55.

The area (A1') of the cross-section if the spirally wound electrode plate of the electrode plate roll 50 may be calculated from Equation 5 by subtracting the area (A12') of the cross-section of a hollow portion 51 of the electrode plate roll 50 from the area (A11') of the cross-section of the electrode plate roll 50.

$$A1' = A11' - A12' = ((T1'+(D1'+L2')/2)^2 \times \pi) - ((D1'+L2)/2)^2 \times \pi)(m^2) \quad \text{(Equation 5)}$$

Here, T1' is a spirally wound thickness of the electrode plate of the electrode plate roll 50, D1' is a diameter of the body 10, and L2' is a distance between an external circumferential surface of the body 10 and an interior circumference of the hollow portion 51 of the electrode plate roll 50.

Further, the area (A2') per meter of the cross-section of the electrode plate roll 40 may be calculated from Equation 6 by using the spirally wound thickness (T1') of the electrode plate, the summation of the thickness (T3') of the current collector 52, the thickness (T4') of the coating layer 53, the thickness 54' (T5') of the protection layer 54, and the thickness (T6') of the separator 55, and the one-meter electrode plate.

Here, the thickness (T1') of the electrode plate may be measured in the first direction of the central axis direction of the body 10, and the length of the electrode plate may be measured in the circumference direction of the electrode plate roll 50 while the electrode plate is spirally wound on the electrode plate roll 50.

$$A2' = T1' \times 1(m^2) = ((T3' + (T4' \times 2)) \times 1(m^2) \qquad \text{(Equation 6)}$$

Therefore, the length (L') of the electrode plate spirally wound on the electrode plate roll 50 may be calculated from Equation 7 using the area (A1') of the cross-section of the spirally wound electrode plate of the electrode plate roll 50 and the area (A2') per meter of the cross-section of the electrode plate roll 40.

$$L' = \frac{A1'}{A2'} \qquad \text{(Equation 7)}$$
$$= \frac{((T1' + (D1' + L2')/2)^2 \times \pi) - ((D1' + L2')/2)^2 \times \pi)}{((T3' + (T4' \times 2) + (T5' \times 2) + T6') \times 1)} \times 1(m)$$

Further, the number (N') of the rechargeable batteries that may be generated by the length (L') of the electrode plate spirally wound on the electrode plate roll 50 may be calculated from Equation 8 by referring to a predetermined length (RL') of the electrode plate used for manufacturing a single rechargeable battery.

$$N' = \frac{L'}{RL'} \qquad \text{(Equation 8)}$$
$$= \frac{(((T1' + (D1' + L2')/2)^2 \times \pi) - ((D1' + L2')/2)^2 \times \pi)}{((T3' + (T4' \times 2) + (T5' \times 2) + T6') \times 1 \times RL')}$$

The electrode plate may include a positive electrode plate and a negative electrode plate, and the length of the positive electrode plate and the length of the negative electrode plate for manufacturing one rechargeable battery may not be the same.

Therefore, the number (N') of the rechargeable batteries that may be generated by the length (L') of the electrode plate spirally wound on the electrode plate roll 50 may vary depending on whether the electrode plate spirally wound on the electrode plate roll 50 is a positive electrode plate or a negative electrode plate.

As a result, the length (L') of the electrode plate spirally wound on the electrode plate roll 50 may be calculated by a ratio of the area (A1') of the cross-section of the spirally wound electrode plate of the electrode plate roll 50 and the area (A2') per meter of the cross-section of the electrode plate roll 40 spirally wound on the electrode plate roll 50.

Further, the number (N') of the rechargeable batteries that may be generated by the electrode plate spirally wound on the electrode plate roll 50 may be calculated by a ratio of the length (L') of the electrode plate spirally wound on the electrode plate roll 50 and the length (RL') of the electrode plate of a single rechargeable battery.

By way of summation and review, an electrode plate may be generated by coating an active material on lateral surfaces that are provided on opposite sides of a current collector with a constant thickness. The electrode plate may be spirally wound and stored as an electrode plate roll.

To measure a length of the electrode plate after a part of the electrode plate has been removed, a typical practice has been to manually measure the length of the electrode plate that is removed and subtract that length from the manually measured original length of the electrode plate. Accordingly, it may require a long time to measure the length of the electrode plate, and it may be difficult to efficiently manage the remaining amount of the electrode plate.

Further, when the initial length of the electrode plate is inaccurately determined or when information on the length of the electrode plate that has not yet been used is lost, the number of rechargeable batteries that are generated by the current remaining amount of the electrode plate may be difficult to predict.

In contrast, embodiments provide an electrode plate manufacturing device for easily measuring a length of an electrode plate and efficiently managing the electrode plate and for predicting a number of rechargeable batteries that may be generated using a remaining amount of the electrode plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A system for measuring a length of an electrode plate, the system comprising:
a body on which an electrode plate roll formed by spirally winding the electrode plate is provided;
a control device to which the body is combined; and
a measuring device including:
  a thickness measurement unit combined with the body and electrically connected to the control device to measure a spirally wound thickness of the electrode plate that is spirally wound on the electrode plate roll, and
  a diameter measurement unit to measure a diameter of a hollow portion of the electrode plate roll, wherein
the control device receives a moving distance of the thickness measurement unit and a moving distance of the diameter measurement unit and calculates the length of the electrode plate of the electrode plate roll wherein:
the thickness measurement unit moves in parallel with a second direction that is perpendicular to a central axis direction of the hollow portion of the electrode plate roll, and
the diameter measurement unit moves in parallel with the second direction.

2. The system as claimed in claim 1, wherein:
the thickness measurement unit includes a first solenoid combined to the body, a first column combined to the first solenoid and moving in the second direction, and a first contact bar combined to a first end of the first column, and
the diameter measurement unit includes a second solenoid combined to the body, a second column combined to the second solenoid and moving in the second direction, and a second contact bar combined to a first end of the second column.

3. The system as claimed in claim 2, wherein the measuring device further includes a sensor in the hollow portion of the body.

4. The system as claimed in claim 3, wherein the sensor includes:
- a sensor case in the hollow portion of the body;
- a first substrate in which a first ultrasonic wave generating device and a first ultrasonic wave receiving device are inside the sensor case corresponding to a bottom portion of the first column; and
- a second substrate in which a second ultrasonic wave generating device and a second ultrasonic wave receiving device are inside the sensor case corresponding to a bottom portion of the second column.

5. The system as claimed in claim 4, wherein:
the first ultrasonic wave generating device and the first ultrasonic wave receiving device measure a moving distance of the first column moving in the second direction, and
the second ultrasonic wave generating device and the second ultrasonic wave receiving device measure a moving distance of the second column moving in the second direction.

6. The system as claimed in claim 5, wherein
the control device further includes a calculating unit that receives values measured by the measuring device, and
the calculating unit receives the moving distance of the first column to calculate a spirally wound thickness of the electrode plate roll, and receives the moving distance of the second column to calculate the diameter of the hollow portion of the electrode plate roll.

7. The system as claimed in claim 6, wherein the control device includes:
an output unit that displays at least one spirally wound thickness of the electrode plate roll, the diameter of the hollow portion of the electrode plate roll, and the length of the electrode plate of the electrode plate roll; and
an input unit that inputs at least one of the diameter of the body and the thickness of the electrode plate.

8. The system as claimed in claim 6, wherein
the electrode plate includes a current collector and a pair of coating layers coated on respective sides of the current collector.

9. The system as claimed in claim 8, wherein
when the spirally wound thickness of the electrode plate roll is T1, the diameter of the body is D1, the moving distance of the second column is L2, the thickness of the current collector is T3, and the thicknesses of the pair of coating layers coated on the sides of the current collector are T4,
the calculating unit calculates a length (L) of the electrode plate spirally wound on the electrode plate roll from the following Equation 3:

$$L = \frac{((T1 + (D1 + L2)/2)^2 \times \pi) - ((D1 + L2)/2)^2 \times \pi}{((T3 + (T4 \times 2)) \times 1)} \times 1(m). \quad \text{(Equation 3)}$$

10. The system as claimed in claim 9, wherein
when a length of the electrode plate for manufacturing a single rechargeable battery is RL,
the calculating unit calculates a number (N) of rechargeable batteries that are generated by the electrode plate spirally wound on the electrode plate roll from the following Equation 4:

$$N = \frac{\left(\begin{array}{c}((T1 + (D1 + L2)/2)^2 \times \pi) - \\ ((D1 + L2)/2)^2 \times \pi\end{array}\right)}{((T3 + (T4 \times 2) \times 1) \times RL)}. \quad \text{(Equation 4)}$$

11. The system as claimed in claim 6, wherein
the electrode plate includes a current collector, a pair of coating layers coated on respective sides of the current collector, and a protection layer coated on the pair of coating layers, and
the electrode plate is spirally wound with a separator to form the electrode plate roll.

12. The system as claimed in claim 11, wherein
when the spirally wound thickness of the electrode plate roll is T1', the diameter of the body is D1', the moving distance of the second column is L2', the thickness of the current collector is T3', the thicknesses of the pair of coating layers are T4', the thickness of the protection layer is T5', and the thickness of the separator is T6',
the calculating unit calculates a length (L') of the electrode plate spirally wound on the electrode plate roll from the following Equation 5:

$$L' = \frac{((T1' + (D1' + L2')/2)^2 \times \pi) - ((D1' + L2')/2)^2 \times \pi}{((T3' + (T4' \times 2) + (T5' \times 2) + T6') \times 1)} \times 1(m). \quad \text{(Equation 5)}$$

13. The system as claimed in claim 12, wherein
when the length of the electrode plate for manufacturing a single rechargeable battery is RL',
the calculating unit calculates the number (N') of rechargeable batteries that are generated by the electrode plate spirally wound on the electrode plate roll from the following Equation 6:

$$N' = \frac{\left(\begin{array}{c}((T1' + (D1' + L2')/2)^2 \times \pi) - \\ ((D1' + L2')/2)^2 \times \pi\end{array}\right)}{\left(\begin{array}{c}(T3' + (T4' \times 2) + (T5' \times 2) + T6') \times \\ 1 \times RL'\end{array}\right)}. \quad \text{(Equation 6)}$$

* * * * *